United States Patent

Peterson et al.

[11] Patent Number: 5,986,712
[45] Date of Patent: Nov. 16, 1999

[54] HYBRID GLOBAL/LOCAL BIT RATE CONTROL

[75] Inventors: Richard Mateer Peterson, East Windsor, N.J.; Edwin F. Strauss, Lakeville, Pa.; Ragnar Hlynur Jonsson, Rejkjavik, Iceland

[73] Assignee: Thomson Consumer Electronics, Inc., Indianpolis, Id.

[21] Appl. No.: 09/004,661

[22] Filed: Jan. 8, 1998

[51] Int. Cl.$^6$ .................................................. H04N 7/26
[52] U.S. Cl. ........................... 348/411; 348/405; 348/419
[58] Field of Search .............................. 348/845.1, 411, 348/419, 405; H04N 7/26

[56] References Cited

U.S. PATENT DOCUMENTS

| | | | |
|---|---|---|---|
| 5,686,964 | 11/1997 | Tabatabai | 348/419 |
| 5,781,237 | 7/1998 | Fukada | 348/405 |
| 5,838,834 | 11/1998 | Saito | 348/405 |

*Primary Examiner*—Howard Britton
*Attorney, Agent, or Firm*—Jerffrey D. Carter

[57] ABSTRACT

A current picture partitioned into a plurality of partitions is received and encoded by determining a total target number of encoded bits for the current picture to avoid overflow or underflow of a video buffer verifier (VBV) maintained by an encoder. The encoder determines a local target number of encoded bits for each partition of the current picture, in accordance with the total target number. A plurality of partition encoders encode each partition, respectively, in accordance with the local target number for said each partition, wherein each partition encoder maintains a local VBV having a local VBV fullness, to monitor local underflow or overflow conditions.

12 Claims, 3 Drawing Sheets

HYBRID GLOBAL/LOCAL BIT RATE CONTROL

BACKGROUND OF THE INVENTION

1. Field of the Invention

The present invention relates to bit rate control in video processing systems, and, in particular, to apparatuses and methods for controlling the bit rate for partitions or stripes of video pictures.

2. Description of the Related Art

Video processing systems employ bit rate control when encoding video signals, such as video pictures (also referred to as video frames or images). Such pictures are typically composed of an array of pixels, which are encoded (for example, by compression) to provide an encoded (or compressed) video signal or data stream. Each encoded picture has a given number of encoded bits, which corresponds to a particular bit rate. For example, for a series of pictures encoded 30 pictures per second, if each encoded picture has 20 kbits on average, then the average bit rate for the encoded bitstream is 30 pics/sec * 20 kbits/pic=600 kbits/sec.

In variable bit rate (VBR) encoders, the pictures encoded have more or less constant quality, but the number of bits generated per picture may have a large variance. In many applications, this is not acceptable, and thus constant bit rate (CBR) digital video encoders are frequently used. A CBR encoder attempts to maintain a specified constant bit rate on average, while maintaining a smoothly varying and uniform subjective picture quality. An optimal bit rate control technique will attempt to maintain the highest possible picture quality, given the constraints of a specified bit rate and decoder buffer size.

Bit rate control limits the average number of bits the CBR encoding system can produce, and the decoder buffer size limits the amount of variation in the instantaneous bit rate. In general, bit rate control calculates the target bit allocation, which involves estimating the number of bits available to encode the next picture.

Bit rate control is, therefore, employed to encode each subsequent picture in a series of pictures so that the encoded bitstream resulting from the encoding of a given current picture matches a target bit rate as closely as possible. In this manner, the quality of pictures is maximized by allocating as many bits per picture as possible, on average, while avoiding overflowing the transmission or processing bandwidth or the buffer of a decoder system receiving the encoded bits. A smaller number of encoded bits for a given picture corresponds to a lower average bit rate for the series of pictures being encoded, and vice-versa. Thus, if a target bit rate is lowered, it may be desirable to encode a given picture to produce a relatively smaller number of encoded bits. In accordance with a provided target bit rate, therefore, a given picture is allocated a target number of encoded bits into which it should be encoded, to achieve the target bit rate.

Various encoding-related parameters are typically adjusted in order to increase or decrease the number of encoded bits expected from encoding a given picture, in order to match the target bit rate provided for the picture. For example, during encoding of pictures, blocks of pixels which constitute the image are often transformed by a discrete cosine transform (DCT) to arrays of DCT coefficients. These coefficients may then be quantized, before being run-length encoded (RLE) and transmitted, for example. A higher quantization level provides, in general, a smaller number of encoded bits for a given block of DCT coefficients having a given complexity or energy level (and a correspondingly lower encoded bit rate), and vice-versa.

Thus, to match a given targeted bit rate as closely as possible, an estimate may be made of the picture's complexity. Using a known or estimated relation between an average complexity X, the quantization level Q, and resulting number of bits S for the resulting encoded bitstream, a Q level can be selected accordingly.

During processing, pictures are often broken up into a plurality of partitions, such as horizontal bands or stripes, for example to allow for parallel processing techniques to be utilized. Such systems are used, for example, in high-definition television (HDTV) systems. Each stripe is encoded and yields a certain number of encoded bits, which ideally add up to the target bits allocated to the picture as a whole. In such systems, there is a need to allocate the target bits among the stripes.

SUMMARY

A current picture partitioned into a plurality of partitions is received and encoded by determining a total target number of encoded bits for the current picture to avoid overflow or underflow of a video buffer verifier (VBV) maintained by an encoder. The encoder determines a local target number of encoded bits for each partition of the current picture, in accordance with the total target number. A plurality of partition encoders encode each partition, respectively, in accordance with the local target number for said each partition, wherein each partition encoder maintains a local VBV having a local VBV fullness, to monitor local underflow or overflow conditions.

DESCRIPTION OF THE PREFERRED EMBODIMENT

As explained above, during processing, pictures are often broken up into a plurality of partitions, such as horizontal bands or stripes, for example to allow for parallel processing techniques to be utilized. Such systems are used, for example, in high-definition television (HDTV) systems. In such systems, bits must therefore be allocated among the stripes.

One technique in this regard would be for a global rate controller to allocate to each stripe a proportionate share of the target bits allocated to the entire picture. However, different parts of the picture frequently have different complexities. For example, a given picture may be partitioned into seven horizontal stripes $S_1, S_2, \ldots S_7$. These stripes are typically of approximately the same size (they may not be exactly the same size since, for example, one of the stripes (typically, the first) is a slightly different size than the others because the number of macroblocks in the total picture height may not be exactly divisible by seven.) In a picture in which blue sky is represented at the top of the picture, and foliage or other more complex objects are represented at the bottom of the picture, the top-most stripe $S_1$ may have a very low complexity and the bottom-most stripe $S_7$ may have a very high complexity. If each stripe is allocated the same number of bits, then stripe $S_7$ will have to be encoded at a lower quality (e.g., higher quantization level Q) than will strip $S_1$, in order to achieve the same amount of encoded bits.

This "uniform" or "proportionate" bit allocation technique is problematic for various reasons. First, for example, it can result in visible artifacts at the boundaries between stripes. Second, it is a sub-optimal use of available bits, since the quality of the more complex stripes could be improved at comparatively little cost to lower-complexity stripes by borrowing bits from the latter stripes, thereby improving overall picture quality. Therefore, it is desirable to allocate bits among stripes more efficiently than in the uniform approach.

It can be difficult, however, to optimally or efficiently allocate bits among stripes in this manner. The present invention employs hybrid global/local stripe rate control, in which each stripe encoder maintains a local effective buffer fullness (also referred to herein as a local VBV (video buffering verifier)), as described in further detail below.

During bit rate control, a (global) VBV (video buffering verifier) is maintained in order to meet the constraints imposed by the finite decoder buffer size. This VBV represents the state of the input buffer of a hypothetical decoder connected to the output of the encoder. It therefore corresponds inversely to the state of the (real) encoder output buffer: when the output buffer is full, the VBV is empty, and vice-versa. Bits are added to the VBV at the target bit rate, and removed once per picture in the amount of the bits used to encode the picture. Thus, the encoder can avoid under- or overflowing the decoder buffer by avoiding a too-full or too-empty VBV.

Figure 1:
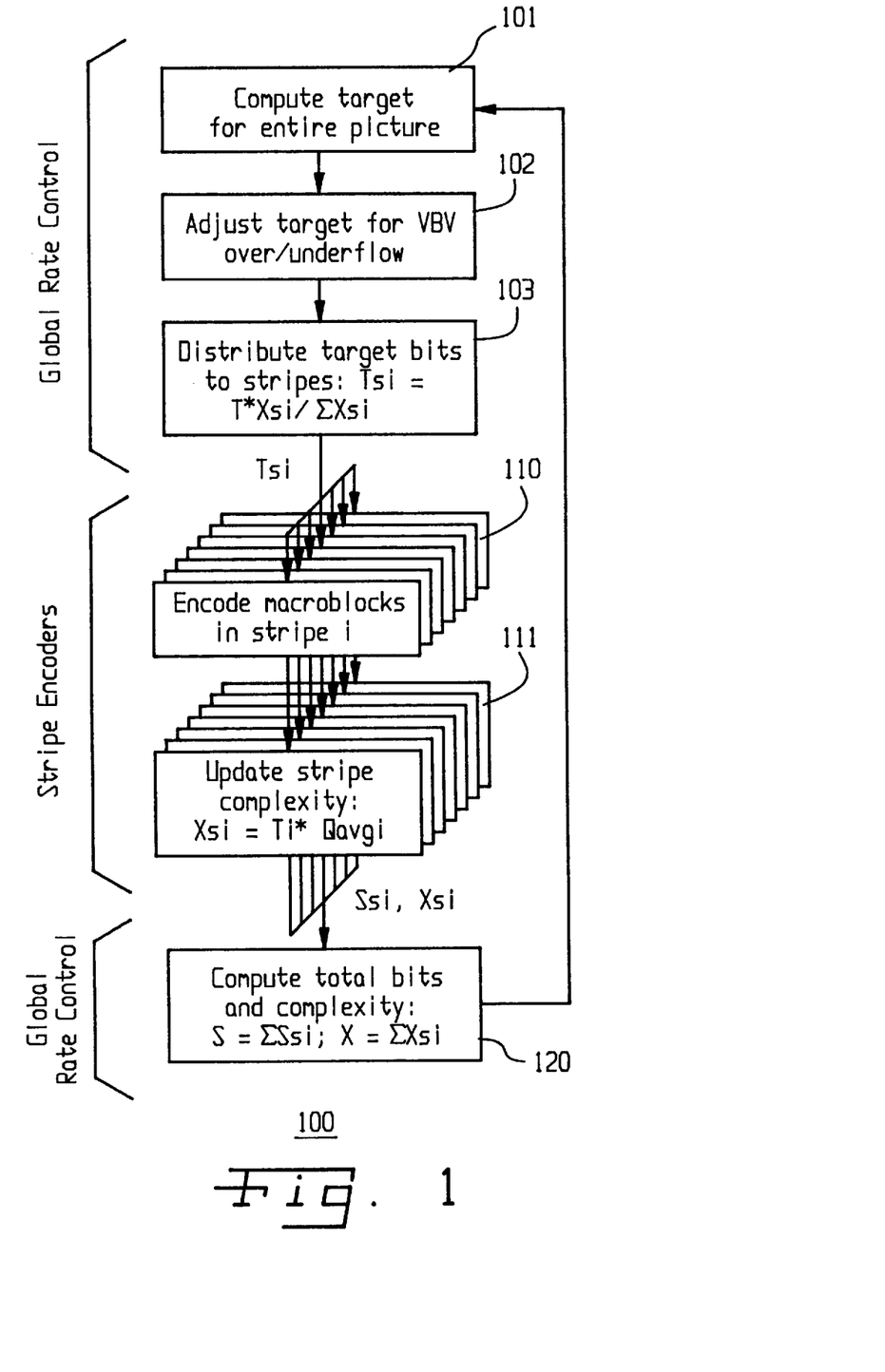
FIG. 1 depicts a flow diagram of the steps of a global-centered stripe rate control method.

Referring now to FIG. 1, there is depicted in flow diagram format the steps of a global-centered stripe rate control method 100. As illustrated, in the global approach of method 100, a target number of bits T is computed for the entire picture (step 101 of FIG. 1). The target T is then adjusted, to avoid over- or under-flow of the VBV (step 102). The target bits T are then distributed to the individual stripes $S_i$ (step 103). To attempt to avoid the inefficiencies indicated above that result from proportionately distributing bits to stripes, in method 100 bits are distributed in accordance with the stripes' individual complexity estimates, i.e., $$T_i = T * X_{Si} / \sum X_{Si},$$

where $T_i$ is the number of bits allocated to stripe $S_i$ and $X_{Si}$ is the complexity estimate for stripe $S_i$. Stripe complexity estimate $X_{Si}$ may be itself derived from the complexity estimate X for the whole picture.

The picture, and hence the partitions or stripes, are typically divided into macroblocks. The macroblocks in each stripe $S_i$ are then encoded, in accordance with the target bits $T_i$ for that stripe (step 110). Each stripe $S_i$ may be encoded in parallel, by stripe encoders. Since the complexity of a stripe can change as the scene shifts, the stripe complexities for each stripe are updated (step 111), for example by using the formula $X_{Si}=T_i*Q_{avgi}$, where $Q_{avgi}$ is the average quantization level used to encode the stripe. (In alternative embodiments, other formulae for X may be employed.) This complexity estimate may then be used as an estimate of the complexity of the corresponding stripe $S_i$ in future pictures, on the assumption (usually, but not always, valid) that the scene content (and hence complexity) will not change too much from picture to picture. The actual number of bits used to encode stripe $S_i$ is represented by $S_{Si}$; the actual number of bits used to encode the whole picture is represented by S.

Next, during global rate control, the total number of bits S actually used and the complexity X of the picture just encoded are calculated as follows:

$$S = \sum S_{Si}; X = \sum X_{Si}$$

(step 120). These figures may be utilized during global rate control, for example in computing the target number of bits, the VBV fullness, and other parameters used to encode subsequent pictures.

Although global-centered stripe rate control method 100 avoids some of the problems associated with proportionately distributing bits to stripes, it is still accompanied by other problems. For example, one problem arising from using global-centered stripe rate control method 100 lies in the handling of so-called "panic mode". It is difficult for the individual stripe encoders to know when a panic situation is occurring. (Panic arises when the VBV is in danger of underflow, reflecting a corresponding situation in the decoder buffer. In this condition, the number of encoded bits must be reduced to a minimum immediately, that is, on the next macroblock. However, the individual stripe encoders do not know the state of the (global) VBV during the encoding of macroblocks, as it is affected by what the other encoders are doing (possibly in parallel).) Accordingly, as discussed in further detail below with reference to FIGS. 2 and 3, in the present invention the individual stripe encoders employ local VBVs, to better handle panic mode.

One technique that could be employed to address some of the problems of the global-centered approach is to use a local-centered approach, in which most of the rate control is performed locally, in the stripe encoders. Such an approach is also problematic for various reasons, however. For example, using such an approach, there is a limit to the adjustment that can be made for stripes of widely differing complexities.

Accordingly, in the present invention, hybrid global/local stripe rate control is employed. In one embodiment, each stripe encoder maintains a local effective VBV buffer and a fullness measure related thereto. Additionally, in an embodiment, each stripe encoder applies a correction factor to adjust the local VBV buffers. The sizes of the local VBVs sum to the size of the decoder buffer, and are proportional to the size of each stripe.

Figure 2:
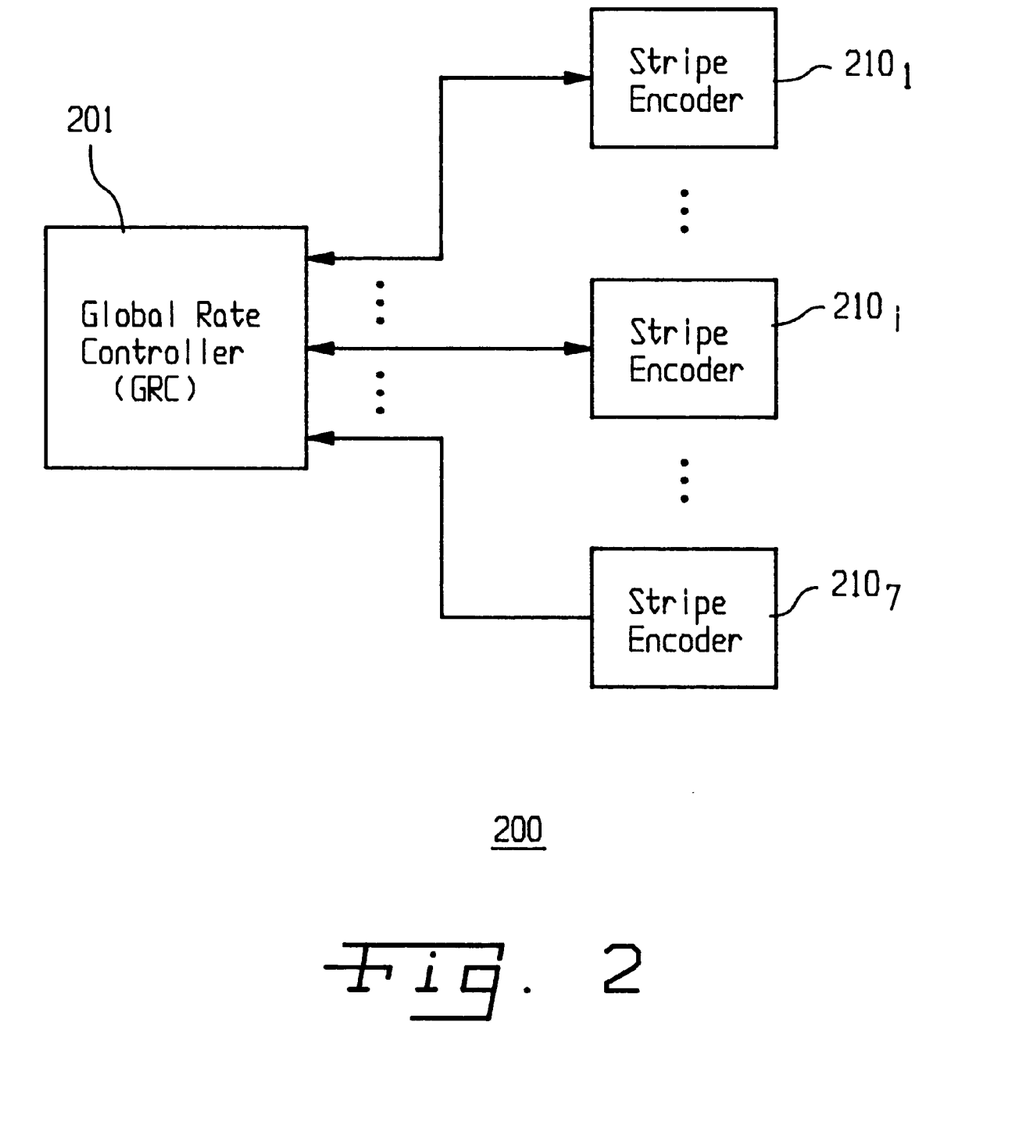
FIG. 2 is a block diagram of a hybrid local/global rate control system, in accordance with an embodiment of the present invention.

Referring now to FIG. 2, there is shown a hybrid local/global rate control system 200, in accordance with an embodiment of the present invention. System 200 comprises a global rate controller (GRC) 201, functionally coupled to a plurality of stripe rate encoders $210_i$. The input picture consists of seven horizontal stripes $S_i$, each of which is encoded in parallel by corresponding stripe encoder $210_i$. GRC 201 and the plurality of stripe rate controllers $210_i$ may be implemented in hardware, or in software, for example on a suitably-programmed general- or special-purpose microprocessor.

Figure 3:
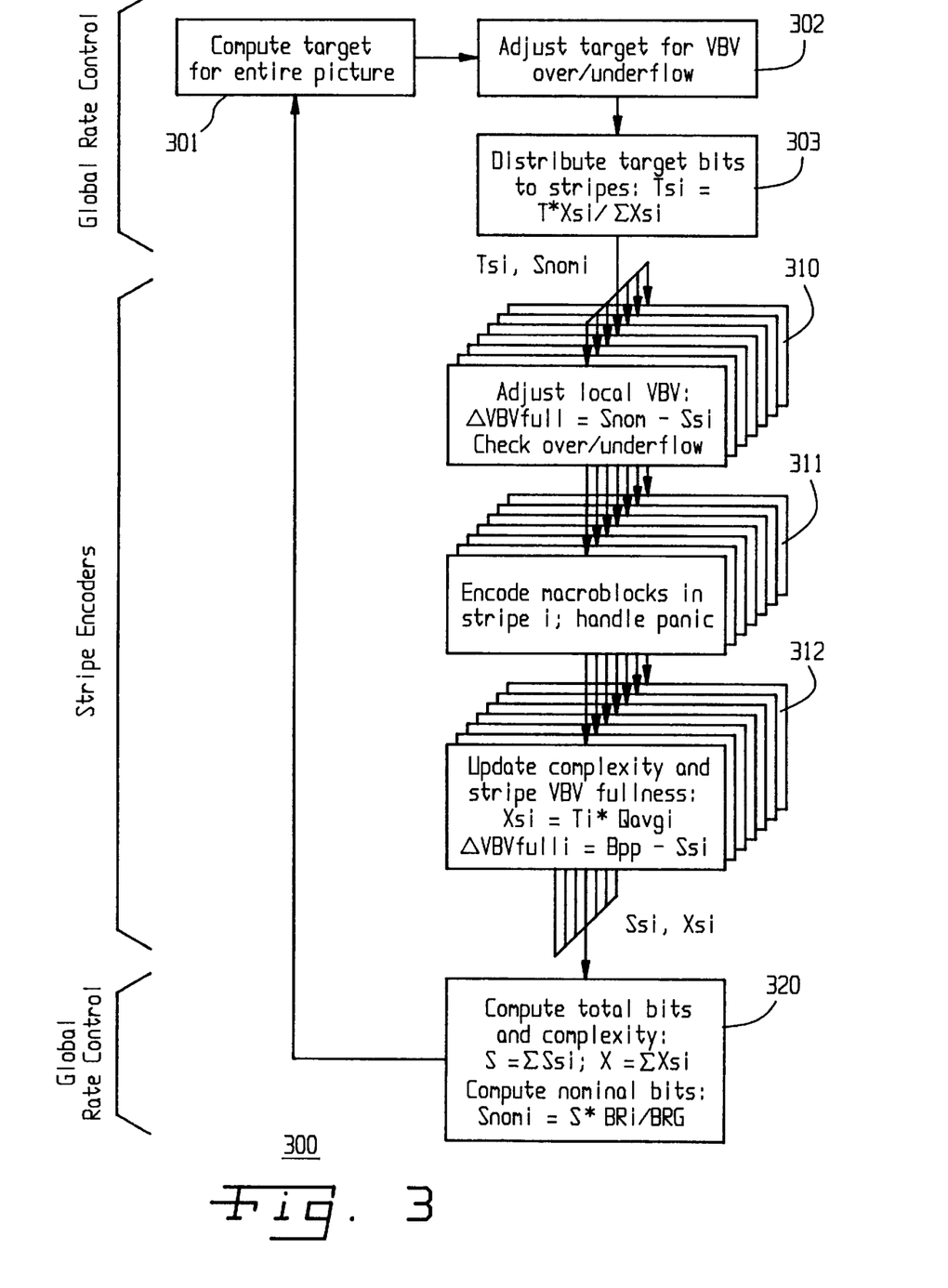
FIG. 3 is a flowchart illustrating the method of operation of the hybrid global/local stripe rate control system of FIG. 2, in accordance with a preferred embodiment of the present invention.

Referring now to FIG. 3, there is shown a flowchart illustrating the hybrid global/local stripe rate control method 300 of operation of hybrid global/local stripe rate control system 200. As illustrated, in the hybrid global/local approach of method 300, a target number of bits T is computed for the entire picture (step 301 of FIG. 3). The target T is then adjusted, to avoid over- or under-flow of the VBV (step 302). In computing target bits, the performance in encoding of a prior group of pictures (GOP) is typically taken into account. Thus, the computation of T may be based on the total number of bits S used to encode previous pictures as well as the actual complexity X of previous pictures.

The target bits T are then distributed or allocated to the individual stripe encoders $210_i$, in accordance with the respective stripes' individual complexity estimates, i.e., $$T_i = T * X_i \Big/ \sum X_i$$

(step 303). Thus, stripes expected to have higher than average complexity tend to have a higher than average number of target bits allocated to them, and vice-versa. At this step, $S_{nomi}$ is also distributed to individual stripe encoders $210_i$, where $S_{nomi}$ is the nominal number of bits assigned to stripe $S_i$, i.e. a proportionate number of bits per stripe (computed after the previous picture, step 320).

Before actually encoding the stripes, each stripe encoder $210_i$ adjusts its own local VBV, in accordance with $\Delta VBV_{full} = S_{nomi} - S_{Si}$ (step 310)(discussed further below). The macroblocks in each stripe $S_i$ are then encoded, in accordance with the target bits $T_i$ and with the updated local buffer fullness $VBV_{full}$ for that stripe (step 311). During encoding, each stripe encoder $210_i$ adjusts its local target $T_i$ as needed, to prevent overflow or underflow in its local VBV, i.e., the local target $T_i$ is modified if it is too large or too small or if the encoding would exhaust or overfill the local VBV buffer for the stripe. The (possibly) modified targets $T_i$ are used in the stripe encoding process, and $S_{Si}$, the actual bits used in encoding the stripe, are reported back to GRC 201 (in step 320, discussed below). Since each stripe encoder $210_i$ has its own local VBV, any local panic conditions may be handled, as appropriate. Each stripe $S_i$ is encoded in parallel by its corresponding stripe encoder $210_i$.

Referring again to step 310, GRC 201 uses the actual encoded bits $S = \Sigma S_{Si}$ to track the overall VBV buffer fullness. Additionally, GRC 201 also uses this information to determine which stripes are using more or less than their share of bits. GRC 201 does this by taking the sum of the actual encoded bits and redistributing them uniformly over the stripes, that is, in proportion to the bit rate for each stripe. These "nominal" bit counts are the number of bits that would have been used if all stripes were of equal complexity. GRC 201 passes them to stripe encoders $210_i$. The difference, $S_{corri} = S_{nomi} - S_{Si}$, is the number of bits that stripe encoder $210_i$ did not need, when the difference $S_{corri}$ is positive.

When the difference $S_{corri}$ is negative, this indicates that stripe encoder $210_i$ previously used a greater than average share of bits. Thus, in general, the difference $S_{corri}$ is subtracted from the stripe VBV buffer as if the nominal number of bits had actually been spent (i.e., $\Delta VBV_{full} = S_{corri} = S_{nomi} - S_{Si}$, as described above with respect to step 310). This has the effect of taking bits away from less complex stripes and lending these bits to the VBV buffers of more complex stripes that had previously used "too many" bits. By this means, if a stripe encoder uses fewer bits than the nominal amount, its effective or VBV buffer fullness does not reflect this; rather, the unused bits are credited to the buffers of other stripes. For example, using simple numbers, if the nominal number of bits allocable to each stripe is 1000 bits, and a given stripe (say, stripe 2) used 1200 bits to encode in the previous picture, then the correction factor is −200. This number (−200) is then subtracted from the local VBV fullness for stripe 2, i.e. 200 is added thereto, signifying that an additional 200 bits may be utilized in encoding stripe 2 for the current picture. Correspondingly, stripes that used less than the average amount in the previous picture have their buffer fullness increased, in effect shifting the VBV buffer or fullness capacity from less complex to more complex stripes for the next picture.

By permitting the borrowing and lending of bits between the stripes, under control of GRC 201 so that all bits are accounted for, while allowing for local adjustment of targets, the hybrid approach of the present invention provides for maximum control of local resources while maintaining equitable distribution of the bits across a picture of varying complexity.

After encoding the stripes, the stripe complexities for each stripe are updated, for example by using the formula $X_{Si} = T_i * Q_{avgi}$ (step 312). Additionally, in step 312 the stripe VBV fullness is updated in accordance with $\Delta VBV_{fulli} = B_{pp} - S_{Si}$, where $B_{pp}$ is the number of bits per picture allocated to the stripe.

Next, during global rate control, the total number of bits S actually used and the complexity X of the picture just encoded are calculated as follows:

$$S = \sum S_{Si}; \quad X = \sum X_{Si}$$

(step 320). Additionally, in step 320 the nominal bits $S_{nomi}$ is computed by allocating an equal number of bits to each stripe, that is, assuming equal complexity for each stripe.

Thus, in the method for providing hybrid global/local stripe rate control of the present invention, in addition to global features, each stripe encoder includes a local VBV buffer. This allows each stripe encoder $210_i$ to track its own effective buffer fullness or VBV fullness, although these buffers do not correspond to an actual decoder buffer, as the global VBV does. Additionally, the hybrid approach of the present invention allows for sharing of bits, that is, allowing a stripe encoder that is dealing with a more complex picture to use more bits without depleting its VBV buffer.

The overall bit rate and VBV buffer size is preferably apportioned among the stripes according to the number of lines in each stripe. For instance, if the overall bit rate, $B_{ppG}$, is 600,000 bits/picture and the VBV buffer size (in 16 kb blocks) is 597, the bits per picture assigned to stripe C (160 lines out of 1088) is 600,000×160/1088=88,235.3 bits/picture and the VBV size assigned to stripe C is 597×160/1088=88. The stripe VBV sizes and bit rates, however, do not rigidly confine the behavior of each stripe.

For illustrative purposes, further details of an exemplary embodiment of the present invention are described with reference to the steps below. In each major step discussed, the unit responsible (GRC 201 or individual stripe encoder $210_i$) and the timing are identified at the start of each major step. Note that, in the following discussion, the stripe encoder $210_i$ sections apply to each stripe $S_i$; the stripe indices are omitted in the following example since each stripe encoder $210_i$ knows only one stripe. Each stripe encoder $210_i$ has its own variables $VBV_{Size}$, $VBV_{fullness}$, $B_{pp}$, $D_{max}$, and so forth, which are distinct from those of GRC 201, where $VBV_{Size}$ is the size of the local VBV, $VBV_{fullness}$ is the current "fullness" or number of bits currently residing in the local VBV, $B_{pp}$ is the portion of the target number of bits for the entire picture allocated to the stripe, and $D_{max}$ is a leeway parameter.

1. Start of sequence (stripe encoder $210_i$):
   a. Initialize the stripe complexity for each picture type, $X_t$:
      $X_I = (160/115) \times$ bit rate
      $X_P = (60/115) \times$ bit rate
      $X_B = (42/115) \times$ bit rate
      where bit rate is the desired bit rate for the stripe in bits per second, and the indices I, P, and B indicate the I (intra), P (predicted), and B (bi-directional) picture types. In one embodiment, the bit rates are chosen proportional to the number of lines per stripe.
   b. Initialize the fullness of the stripe or local VBV:
      $VBV_{fullness} = VBV_{Size} - B_{pp}$
      where VBVsize is the number of bits in the VBV for the stripe, and $B_{pp}$ is the bits per picture (bit rate/picture rate) allocated to the stripe.
   c. Initialize reaction parameters, $r_t$ (these may be overridden by configuration parameters), and the bit error at the start of picture type t (t=I, P, B), $d_{0t}$:
      $r_I = 1.5 \times B_{pp}/31$
      $r_P = 3.0 \times B_{pp}/31$
      $r_B = 2.0 \times B_{pp}/31$
      $d_{0t} = 16 \times r_t$, t=I, P, B
   d. Initialize the macroblock complexities and their sum, for profiling (allocating bits by NMU within a stripe). An NMU (Number of Macroblock Units) is a group of macroblocks. A group of macroblocks is one row, in one embodiment, although in alternative embodiments, the group of macroblocks could consist of simply one macroblock. The processing load and storage space are reduced, and variations in image quality are smoothed, if profiling is done on groups of macroblocks rather than for every macroblock.
      $X_{NMUt}(j) = 1, j=1$ to $N_{NMU}$, t=P, B
      $X_{NMUtotalt} = N_{NMU}$
      for each picture type and for each NMU, where $N_{NMU}$ is the number of NMUs in the stripe. (The macroblock complexity for I frames is computed in the first pass.)
   e. Initialize the encoded bits for the previous stripe, $S_s$, to 0, so that the encoded bits correction for the first picture will be 0.
   f. Initialize $n_{hdr}$, the number of bits in sequence, GOP, and picture headers, to 2450 (an estimate until an actual count is obtained after the first picture).
   g. Write the sequence header in stripe 0 only. Other stripes write no sequence header.
2. Start of sequence (GRC 201):
   a. Initialize the global stripe complexity for each picture type, $X_{Gt}$:
      $X_{GI} = (160/115) \times$ bit $\text{rate}_G$
      $X_{GP} = (60/115) \times$ bit $\text{rate}_G$
      $X_{GB} = (42/115) \times$ bit $\text{rate}_G$
      where bit rateg is the desired global bit rate in bits per second, and should be configured as the sum of the M stripe bit rates used in step 1a:

$$\text{bit rate}_G = \sum_{i=1 \text{ to } M} (\text{bit rate}_i)$$

b. Initialize global VBV fullness:
      $VBVfullness_G = VBVsize_G - B_{ppG}$
      where $VBVsize_G$ is the number of bits in the global VBV (which should be configured as the sum of the M stripe VBV sizes), and $B_{ppG}$ is the bits per picture for the entire picture:

$$VBV\ size_G = \sum_{i=1 \text{ to } M} (VBV\ size_G)$$

$B_{ppG}$ = bit $\text{rate}_G$/picture rate
   c. Initialize the nominal bits $S_{nom}$ (see step 10f) for each stripe to 0.
3. Start of group of pictures (GOP)(GRC 201):
   a. Replenish R, the number of bits allotted to the remainder of the current GOP:
      $R \leftarrow R + N_{curr} \times B_{ppG}$
      where $N_{curr}$ is the number of pictures in the current GOP:
      $N_{curr} = N - (M-1)$, first GOP
      $N_{curr} = N$, after first GOP
      where N is the GOP size and M is the prediction distance (between P frames). The first GOP is different because later GOPs include the (M−1) P frames that precede the I frame in viewing order (these were not included in the preceding GOP).
   b. Update $N_t$, the number of frames of each type remaining in the current GOP:
      $N_P = N/M - 1$
      $N_B = N_{curr} - N_P - 1$
4. Start of picture (GRC):
   a. Determine the target number of bits $T_G$ for the current picture, depending on its picture type t (I, P, or B):
      $T_{GI} = R/(1 + (N_P X_P/K_P X_I + N_B X_B/K_B X_I)$
      $T_{GP} = R/(N_P + N_B K_P X_B/K_B X_P)$
      $T_{GB} = R/(N_B + N_P K_B X_P/K_P X_B)$
      with picture-type constants $K_P = 1.2$ and $K_B = 1.5$.
   b. Check for VBV underflow or overflow using $T_t$:
      $VBVfullness_G + B_{ppG} - T_{Gt} > VBVsize_G$ overflow
      $VBVfullness_G + B_{ppG} - T_{ppG} - T_{Gt} < D_{maxG} \rightarrow$ underflow
      where $D_{maxG}$ is a leeway parameter,
      $D_{maxG} = 2 \times B_{ppG}$
      If an overflow condition occurs, increase the target number of bits for the picture:
      $T_{Gt} \leftarrow VBVfullness_G + B_{ppG} - VBVsize_G$
      If an underflow condition occurs, decrease the target number of bits for the picture:
      $T_{Gt} \leftarrow VBVfullness_G + B_{ppG} - D_{max\ G}$
   c. Put limits on the target relative to the average bits per picture:
      $T_{Gt} \leftarrow \max(T_{Gt}, B_{ppG}/8)$
      $T_{Gt} \leftarrow \min(T_{Gt}, 4 \times B_{ppG})$
   d. Allocate the total target bits, $T_{Gt}$, to the stripes according to their complexities $X_{ti}$:

$$T_i = X_{ti} \times T_{Gt} / \sum_{i=1 \text{ to } M} (X_{ti}),\ i = 0 \text{ to } M$$

An adjustment is made in $T_0$ if necessary to ensure that the total target is accurate:

$$T_0 \leftarrow T_0 + \left( T_{Gt} - \sum_{i=1 \text{ to } M} (T_i) \right)$$

e. Compute VBV delay:
      $VBVdelay = 90000.0 \times vbvFullness_G/(400.0 \times \text{bit rate}_G)$
   f. Pass adjusted targets $T_i$ and nominal bits $S_{nomi}$ (see step 10f) to each stripe encoder $210_i$, and pass picture height, VBV size, bit rate, VBV delay, and number of stuffing bits to stripe 0.

5. Start of picture (stripe encoder $210_i$):
   a. Read from GRC 201 (or, alternatively, other controlling processing element): $T_S$ (=$T_t$), the target bit budget for this stripe, and $S_{nom}$, the nominal bits for this stripe; for stripe 0, also read picture height, VBV size, bit rate, VBV delay, and bits to stuff.
   b. Add stuffing bits to bitstream in stripe 0.
   c. Apply the correction factor:
   $S_{corr}=S_{nom}-S_t$
   VBVfullness←VBVfullness−$S_{corr}$
   where $S_t$ is the total number of bits used to encode the last picture (see step 9a). This correction has the effect of transferring bits between the stripes. The nominal bit count is the number of bits the stripe would have used in encoding the previous picture if bits had been allocated uniformly over the entire picture. $S_{corr}$ is the number of bits out of this number that the stripe did not need (or excess bits needed, if it is negative). These bits are then taken out of the stripe's VBV buffer; in effect, they are "donated" to other, more complex stripes (or received from less complex stripes, if the correction is negative).
   d. Check for VBV underflow or overflow using $T_S$:
   VBVfullness+$B_{pp}$−$T_S$>VBVsize→overflow
   VBVfullness+$B_{pp}$−$T_S$<$D_{max}$→underflow
   If an overflow condition occurs, increase the target number of bits for the picture:
   $T_S$←VBVfullness+$B_{pp}$−VBVsize
   If an underflow condition occurs, decrease the target number of bits for the picture:
   $T_S$←max(0, VBVfullness+$B_{pp}$−$D_{max}$)
   where $D_{max}$ is a leeway parameter set at initialization to
   $D_{max}=2\times B_{pp}$
   e. Put limits on the target relative to the average bits per picture:
   $T_S$←max($T_S$, $B_{pp}/8$)
   $T_S$←min($T_S$, $4\times B_{pp}$)
   f. Compute $K_{MB}(j)$, the macroblock complexity factor:
   $K_{MB}(j)=X_{min}(j)/(3X_{avg})+2/3$
   where $X_{min}(j)$ is the minimum bits per block over the blocks in $MB_j$ and neighboring blocks (computed in first pass), and $X_{avg}$ is the average of $X_{min}$ over the entire stripe. This computation could be done at the start of each macroblock, in which case an array is not needed to hold $K_{MB}(j)$.
   g. Compute $\alpha_t$, the profile scaling factor for picture type t, used in calculation of macroblock bit budgets (see step 6a):
   $\alpha_t=(T_S-n_{hdr})/(X_{NMUtott}\times L_{NMU})$
   where $X_{NMUtott}$ is the total bit budget for the last picture of this type (see step 8b); $L_{NMU}$ is the number of macroblocks per NMU; and $n_{hdr}$ is an approximation of the number of bits in the picture header (see step 9b). The division by the number of macroblocks per NMU makes $T_{NMU}(j)$ (step 6a) the target bits per macroblock (rather than NMU), assuming the same target for each macroblock in the NMU.
   h. Calculate the initial bit error, $d_0$, if the picture is an I frame or if panic mode is anticipated (namely, if $T_t$>VBVfullness−$D_{max}$−panLevel):
   $d_{0t}=X_t\times r_t/T_t$ Limit $d_0$ to the range $[-4\times B_{pp}, 4\times B_{pp}]$.
   i. Set the panic margin:
   pan=VBVfullness−panLevel
   where panLevel is initialized to $B_{pp}/2$.
   j. Clear the average quant accumulator, $Q_t$, and the count of non-panic-mode macroblocks, $n_{nopan}$.

6. Start of macroblock group (NMU) (stripe encoder $210_i$):
   a. Compute the macroblock bit budget $T_{NMU}(j)$, the target bits per macroblock for each macroblock in this (j-th) NMU, based on $X_{NMUt}(j)$(see step 8b), the relative complexity of the same NMU in the last picture of the same type:
   $T_{NMU}(j)=X_{NMUt}(j)\times\alpha_t$ 7. Start of macroblock (stripe encoder $210_i$):
   a. Compute the complexity factor (gain) for the current (k-th) macroblock:
   $G_{MB}(k)=K_{MB}(k)/r_t$
   This is then multiplied by $d_{k-1}$, the bit error before macroblock k, to give the quantization step size $q_{MB}(k)$ for this macroblock:
   $q_{MB}(k)=G_{MB}(k)\times d_{k-1}$
   b. Now encode the macroblock using quantization step size $q_{MB}(k)$. The number of bits used to encode the macroblock is $S_{MB}(k)$. Compute $d_k$, the bit error after encoding macroblock k, by comparing the actual bits to the macroblock bit budget $T_{NMU}(j)$ for the current NMU j.
   $d_0=d_{0t}$
   $d_k=d_{k-1}+S_{MB}(k)-T_{NMU}(j)$ 8. End of NMU (stripe encoder $210_i$):
   a. Accumulate the sum of quants over the entire stripe in Q, given $Q_{NMU}(j)$, the sum of the quants used for each macroblock in the current (j-th) NMU:
   Q←Q+$Q_{NMU}(j)$
   This should only be done if the panic-mode flag is not set, since Q is not used in panic mode.
   b. Compute the bit budget (or NMU complexity) $X_{NMUt}(j)$ and accumulate the sum $X_{NMUtott}$, for profiling future pictures:
   $X_{NMUt}(j)=S_{NMU}(j)\times Q_{NMU}(j)$
   $X_{NMUtott}$←$X_{NMUtott}+X_{NMUt}(j)$
   where $S_{NMU}(j)$ is the number of bits used to encode NMUj.
   c. Increment $n_{nopan}$, the number of macroblocks not in panic mode, by $N_{NMU}$, the number of macroblocks per NMU, if the panic-mode flag is not set.

9. End of picture (EOP) (stripe encoder $210_i$):
   a. Set $S_S$ to the number of bits used to encode the entire stripe (the sum of $S_{MB}(k)$).
   b. For stripe 0 only, find $n_{hdr}$, the number of bits in sequence, GOP, and picture headers, which is used in scale factor computation (5 g).
   c. Update VBV fullness:
   VBVfullness←VBVfullness+$B_{pp}-S_t$
   d. Divide Q by $n_{nopan}$, where $n_{nopan}$ is the number of macroblocks in which panic mode is not invoked, to complete the calculation of the average quant (see step 8a):
   Q←Q/$n_{nopan}$, $n_{nopan}$>0
   Q←$Q_{max}$, $n_{nopan}$=0
   where $Q_{max}$ is 62 for linear quant, 127 for non-linear quant.
   e. Compute complexity for the entire stripe, for use in Global Rate Control:
   $X_t=\min(X_{max}, S_S\times Q\times n_{MB}/n_{nopan})$, $n_{nopan}$>0

$X_t = \min(X_{max}, S_S \times Q \times n_{MB})$, $n_{nopan}=0$ where $n_{MB}$ is the total number of macroblocks in the stripe; $n_{nopan}$ is the number of macroblocks in which panic mode is not invoked; and $X_{max}=2^{27}$ is a limit imposed to be sure the total picture complexity does not overflow. The complexity is scaled up in the case of panic mode to give an estimate of the complexity of the entire image on the assumption that the complexity of macroblocks not coded is comparable to that of the macroblocks that were coded.

f. Set $d_{0t}$ for the next picture of type t to the final value of d for this picture.

g. For stripe 0, write the picture header, including the total picture height (passed from GRC 201) instead of the stripe height. Other stripes do not write a picture header.

h. Send $S_i$, the number of bits used to encode the stripe, and $X_t$, the complexity of the last picture of the same type as the next picture, to GRC 201.

10. EOP (GRC 201):

a. Read $S_{ti}$, the number of bits used to encode each stripe i, and $X_{t'i}$, the complexity of each stripe, from the stripe encoders; t is the picture type (I, P, B) of the picture just encoded, and t' is the picture type of the next picture to be encoded.

b. Sum the M stripe complexities $X_{t'i}$ and encoded bits $S_{ti}$ to give global complexities $X_{Gt'}$ and encoded bits $S_t$:

$$X_{Gt'} = \sum_{i=1 \text{ to } M} (X_{t'i})$$

$$S_t = \sum_{i=1 \text{ to } M} (S_{ti})$$

c. Update overall VBV fullness:
VBVfullness←VBVfullness+$B_{pp}$−$S_t$ d. Calculate number of bits to stuff in stripe 0:
if vbvFullness>vbvSize−$B_{pp}$
  stuffbits=vbvFullness−vbvSize+$B_{pp}$
  S←S+stuffbits
  VBVfullness←VBVfullness−stuffbits else
  stuffbits=0 e. Update the number of bits remaining, and the number of pictures of the current type remaining, in the current GOP:
R←R−S
$N_t$←$N_t$−1(t=P or B picture)

f. Compute the nominal bits for each stripe, to be passed to the stripe encoders. This is the number of bits that would be allocated to the stripe if all stripes had equal complexity (see step 4f):
$S_{nomi}=S_{ti}$ * bit $\text{rate}_i$/bit $\text{rate}_G$, i=1 to M Although the embodiments of the present invention described above is implemented with regard to a plurality of horizontal stripes, in alternative embodiments of the present invention, the picture is divided into other types of partitions. For example, the present invention may be applied to pictured divided into a plurality of vertical stripes, or other types of partitions, such as rectangular tiles.

In an alternative embodiment, a control system similar to control system 200 of FIG. 2 may also be employed to implement global-centered stripe rate control method 100 of FIG. 1. In another alternative embodiment, control system 200 is a partitioned or stripe-based rate control system that may be configured to implement either method 100 or 200.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits to carry out the desired process.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for encoding image signals, comprising the steps of:

(a) receiving a current picture partitioned into a plurality of partitions;

(b) determining a total target number of encoded bits for the current picture to avoid overflow or underflow of a video buffer verifier (VBV);

(c) determining a local target number of encoded bits for each partition of the current picture, in accordance with the total target number; and (d) encoding each partition with a respective partition encoder in accordance with the local target number for said each partition, wherein each partition encoder maintains a local VBV having a local VBV fullness, to monitor local underflow or overflow conditions.

2. The method of claim 1, wherein step (d) comprises the step of modifying, with the respective partition encoders, the local target number for each partition to prevent overflow or underflow in the local VBV for said partition.

3. The method of claim 1, wherein step (c) comprises the steps of:

(1) estimating a complexity for each partition; and (2) determining the local target number of encoded bits for each partition in accordance with the total target number and in accordance with the complexity estimate for each said partition.

4. The method of claim 1, wherein step (d) comprises the step of adjusting, with the respective partition encoders, the local VBV fullness for each respective VBV, before encoding the partitions, to increase the local VBV fullness for partitions for which a corresponding partition in a previous picture produced a higher than average number of encoded bits and to decrease the local VBV fullness for partitions for which a corresponding partition in a previous picture produced a lower than average number of encoded bits.

5. The method of claim 1, wherein the determining of steps (b) and (c) are performed by a global rate controller, and the global rate controller maintains the VBV.

6. The method of claim 1, wherein an encoder determines the local target number of encoded bits for each partition of the current picture, in accordance with the total target number and with an estimated complexity for each respective partition.

7. The method of claim 1, wherein the encoded partitions are combined to form the encoded current picture and the VBV corresponds to a decoder buffer of a decoder system adapted to receive the encoded current picture.

8. The method of claim 1, wherein the partitions are horizontal stripes.

9. The method of claim 8, wherein the plurality of horizontal stripes comprise seven approximately equally-sized horizontal stripes.

10. The method of claim 1, wherein the partition encoders encode the partitions in parallel.

11. An apparatus for encoding a current picture of a sequence of pictures, comprising:
  (a) an encoder, wherein the encoder receives the current picture having a plurality of partitions, determines a total target number of encoded bits for the current picture to avoid overflow or underflow of a video buffer verifier (VBV) maintained by the encoder, and determines a local target number of encoded bits for each partition of the current picture, in accordance with the total target number; and
  (b) a plurality of partition encoders, one for each partition, wherein each partition encoder encodes a respective partition in accordance with the local target number for said partition and maintains a local VBV having a local VBV fullness, to monitor local underflow or overflow conditions.

12. A storage medium having stored thereon a plurality of instructions for encoding image signals, wherein the plurality of instructions, when executed by a processor, cause the processor to perform the steps of:
  (a) receiving a current picture partitioned into a plurality of partitions;
  (b) determining a total target number of encoded bits for the current picture to avoid overflow or underflow of a video buffer verifier (VBV);
  (c) determining a local target number of encoded bits for each partition of the current picture, in accordance with the total target number; and
  (d) encoding each partition with a respective partition encoder in accordance with the local target number for said each partition, wherein each partition encoder maintains a local VBV having a local VBV fullness, to monitor local underflow or overflow conditions.

* * * * *